United States Patent
Inoue et al.

(10) Patent No.: US 7,207,312 B2
(45) Date of Patent: Apr. 24, 2007

(54) INTERNAL COMBUSTION ENGINE

(75) Inventors: Koichi Inoue, Kanagawa (JP); Satoshi Nishii, Kanagawa (JP); Kouichi Mori, Kanagawa (JP); Shunichi Mitsuishi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 11/389,922

(22) Filed: Mar. 27, 2006

(65) Prior Publication Data
US 2006/0213480 A1     Sep. 28, 2006

(30) Foreign Application Priority Data

| Mar. 28, 2005 | (JP) | ............................. 2005-091240 |
| Mar. 28, 2005 | (JP) | ............................. 2005-091257 |
| Mar. 28, 2005 | (JP) | ............................. 2005-091279 |

(51) Int. Cl.
*F02P 15/02*     (2006.01)
*F02B 23/00*     (2006.01)

(52) U.S. Cl. ...................................... 123/310; 123/661

(58) Field of Classification Search ................ 123/301, 123/302, 310, 661
See application file for complete search history.

(56) References Cited

U.S. PATENT DOCUMENTS

| 4,202,306 A | * | 5/1980 | Nakajima et al. ............ 123/310 |
| 4,203,393 A | * | 5/1980 | Giardini ...................... 123/260 |
| 4,421,081 A | * | 12/1983 | Nakamura et al. ........... 123/310 |
| 4,768,487 A | | 9/1988 | Yamamoto et al. |
| 5,269,270 A | | 12/1993 | Suzuki et al. |
| 5,305,720 A | | 4/1994 | Ando et al. |
| 6,267,107 B1 | * | 7/2001 | Ward .......................... 123/661 |
| 6,705,275 B2 | | 3/2004 | Fukuzumi |
| 6,832,589 B2 | * | 12/2004 | Kremer et al. ............... 123/661 |
| 2005/0241612 A1 | * | 11/2005 | Ward .......................... 123/310 |

FOREIGN PATENT DOCUMENTS

| DE | 102 23 408 | 12/2003 |
| EP | 1 130 240 | 9/2001 |
| JP | 04-183925 | 6/1992 |
| JP | 06093865 | 4/1994 |
| JP | 06288332 | 10/1994 |
| WO | WO-01/02707 | 1/2001 |

* cited by examiner

*Primary Examiner*—T. M. Argenbright
(74) *Attorney, Agent, or Firm*—Rader, Fishman & Grauer PLLC (57) ABSTRACT

An internal combustion engine that includes a cylinder block formed with a cylinder bore, a cylinder head operatively connected to the cylinder block; a piston slidably disposed in the cylinder bore to define a combustion chamber; an engine front side squish area and a rear side squish area where the engine front and rear side squish areas include narrow gaps formed between a cylinder head and the piston is disclosed. The engine front side squish area and the engine rear side squish area generate a squish flow in the combustion chamber in response to the piston moving within the cylinder bore. Engine front and rear side igniter plugs are also provided that each include a pair of electrodes placed adjacent the respective engine front and rear side squish areas so that squish flow may pass through an igniter gap defined between the pairs of electrodes of the front and rear side igniter plugs.

21 Claims, 9 Drawing Sheets

INTERNAL COMBUSTION ENGINE

RELATED APPLICATIONS

The disclosures of Japanese Patent Application Nos. 2005-091240, 2005-091257, and 2005-091279, all filed Mar. 28, 2005, including their respective specifications, claims and drawings, are incorporated herein by reference in their entireties.

FIELD

Disclosed herein is a internal combustion engine.

BACKGROUND

The multiple-point ignition combustion engine disclosed in Japanese Laid Open Application No. H04-183925 strives to provide combustion stability by arranging ignition plugs. The arrangement of the ignition plugs is determined based on the intensity of the swirl generated, the distribution of the mixture rate, and the distribution of the remaining gas.

However, even if the ignition plugs are arranged as described above, there is still room to further reduce emissions, such as hydrocarbons HC, etc., in the exhaust. In particular, there is a large amount of room for improvement for an engine that generates squish.

SUMMARY

The embodiments presented herein provides an internal combustion engine that includes a cylinder block formed with a cylinder bore, a cylinder head operatively connected to the cylinder block; a piston slidably disposed in the cylinder bore to define a combustion chamber; an engine front side squish area and a rear side squish area where the engine front and rear side squish areas include narrow gaps formed between a cylinder head and the piston. The engine front side squish area and the engine rear side squish area generate a squish flow in the combustion chamber in response to the piston moving within the cylinder bore. Engine front and rear side igniter plugs are also provided that each include a pair of electrodes placed adjacent the respective engine front and rear side squish areas so that squish flow may pass through an igniter gap defined between the pairs of electrodes of the front and rear side igniter plugs.

BRIEF DESCRIPTION OF THE DRAWINGS

These and other features and advantages of the present steering control system will be apparent from the ensuing description taken in conjunction with the accompanying drawings, in which.

DETAILED DESCRIPTION OF ILLUSTRATED EMBODIMENTS

Figure 1A:
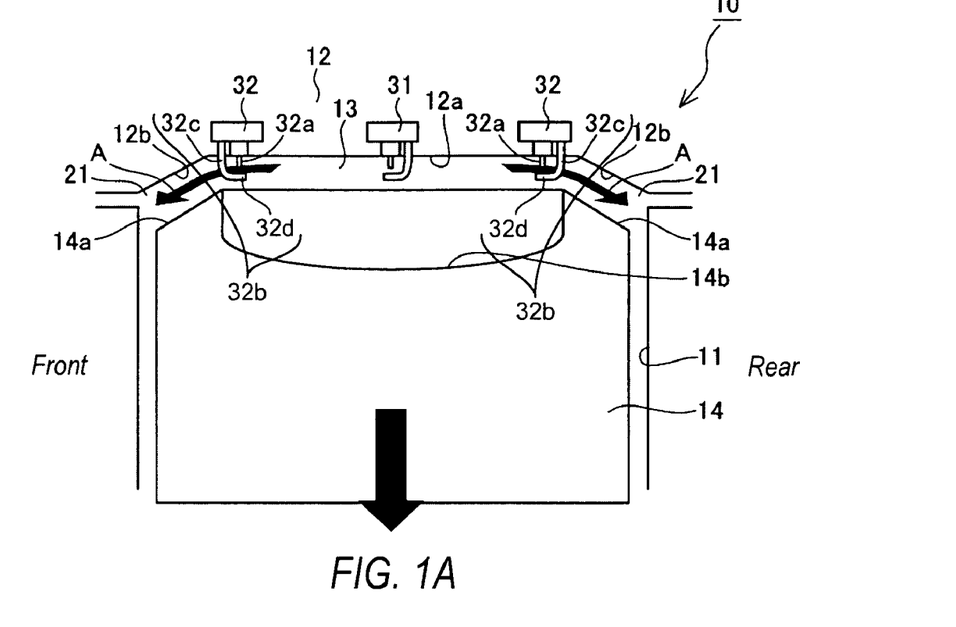
FIG. 1A is a side elevational view of a peripheral plug arrangement of a internal combustion engine according to a first embodiment.
Figure 1B:
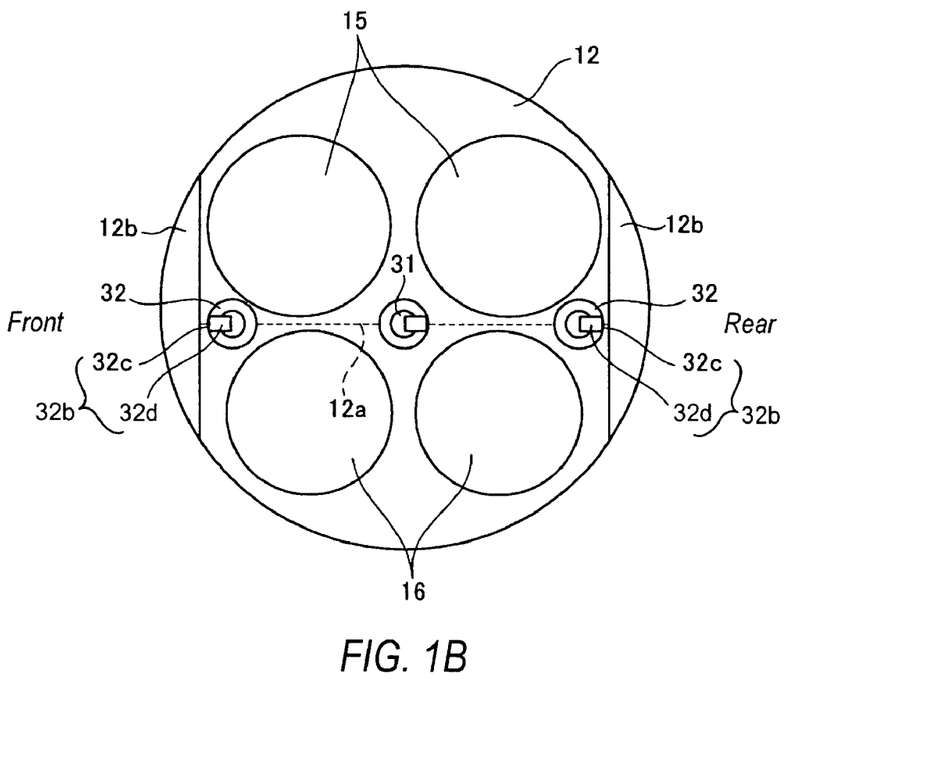
FIG. 1B is a top plan view of FIG. 1A.

FIGS. 1A and 1B illustrate a peripheral plug arrangement of an internal combustion engine according to a first embodiment, where FIG. 1A is a side elevational view, and FIG. 1B is a plan view of a cylinder head that is shown in FIG. 1A.

The internal combustion engine 10 shown in FIGS. 1A–1B includes a combustion chamber 13 that is comprised of a cylinder block 11 and cylinder head 12. This combustion chamber 13 is a ridge-roof type combustion chamber and, as shown in FIG. 1B, inlet valves 15 are provided on one side and exhaust valves 16 are provided on the other side across the ridge-roof line 12a. In addition, a center plug 31 and peripheral plugs 32 are provided along the ridge-roof line 12a.

A sloped crown surface 14a, which becomes more projected at a center portion of the combustion chamber 13, is formed on the periphery of the crown surface of the piston 14 at a lower portion of the ridge-roof line 12a. In addition, a depressed area 14b is formed around the center of the piston 14.

On the internal wall of the cylinder head 12, a cylinder head sloped surface 12b is formed. Cylinder head sloped surface 12b generally corresponds to the sloped crown surface 14a.

When the piston 14 moves up toward the upper dead center and the sloped crown surface 14a comes close to the cylinder head sloped surface 12b, the air that is compressed by the sloped crown surface 14a and cylinder head sloped surface 12b flows out in a direction toward the center of the combustion chamber (normal squish). When the piston 14 moves down and away from the upper dead center of the cylinder head 12, the sloped crown surface 14a distances itself away from the cylinder head sloped surface 12b. Air then flows into the space that is formed by the sloped crown surface 14a and cylinder head sloped surface 12b (reverse squish). The reverse squish is indicated with arrow A in FIG. 1A. As described above, the sloped crown surface 14a and the cylinder sloped surface 12b cooperate to form a squish generating portion 21. In the embodiment shown in FIGS. 1A and 1B, there is an engine front side squish area and an engine rear side squish area, indicated generally as "Front" and "Rear" in the drawings when viewed from the axis direction of the crankshaft.

The center plug 31 is provided approximately at the center of the cylinder head 12. The center plug 31 is ignited before the compressed air is caused when the piston 14 moves toward the upper dead center of the cylinder head 12. The peripheral plugs 32 are provided at a location where the squish generated by the squish generating portion 21 can flow between a center electrode 32a and a ground electrode 32b. Here, the center electrode 32a extends substantially straightly in an axial direction of the igniter plug 32. The ground electrode 32b has a generally parallel part 32c which is substantially parallel with the center electrode 32a and a generally vertical part 32d extending from the generally parallel part 32c, which is substantially vertical with the center electrode 32a so that an end of the center electrode 32a faces the generally vertical part 32d in order to form an igniter gap. The generally parallel part 32c is called a leg of the ground electrode 32b in the following description. In this embodiment, the peripheral plugs 32 are ignited when the reverse squish flows between the center electrode 32a and ground electrodes 32b. Therefore, ignition energy for the peripheral plugs 32 is reinforced compared to that of the center plug 31 so that the peripheral plugs 32 can be securely ignited without being extinguished due to the gas flow. The details of the position of the peripheral plugs 32 are determined through preliminary testing, etc. In addition, the peripheral plugs 32 are aligned so that the leg 32c of the ground electrode 32b is positioned on the same side of the squish generating portion 21 (the side closer to the squish generation portion relative to the center electrode 32). In one embodiment, this alignment can be realized by adjusting the starting point of a thread of a female screw formed on the cylinder head 12 and a male screw that is formed on the peripheral plugs 32. In addition, the alignment can be carried out by using an alignment mark that corresponds to the position of the ground electrode leg 32c that may be provided on the housing, as the marker.

Figure 2:
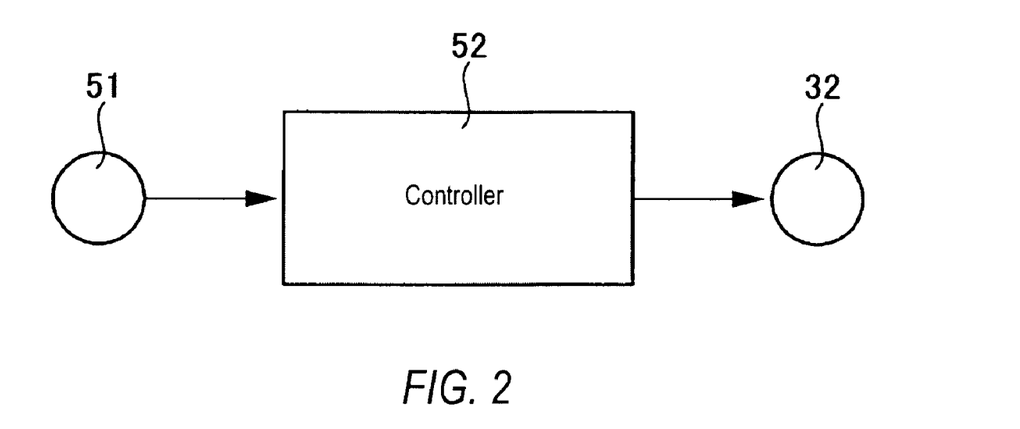
FIG. 2 is a block diagram illustrating a control system for the ignition timing of a peripheral plug.

FIG. 2 is a drawing that describes a control system 50 for the ignition timing of the peripheral plugs 32.

The ignition timing control system 50 for each of the peripheral plugs 32 is comprised of a crank angle sensor 51, controller 52 and a peripheral plug 32.

The controller 52 controls the ignition timing of the peripheral plugs 32 based on the crank angle that is detected by the crank angle sensor 51. The controller 52 is comprised of a microcomputer having a central processing unit (CPU), read only memory (ROM), random access memory (RAM) and an input/output interface (I/O interface). The controller 52 can be comprised of a multiplicity of microcomputers.

In the present embodiment, the controller 52 ignites the peripheral plugs 32 after compression of air caused by the piston 14 moving toward the upper dead center of the cylinder head 12 and when the reverse squish flows between the center electrode 32a and ground electrode 32b. More preferably, in the embodiment shown in FIGS. 1A and 1B, the peripheral plugs 32 ignite before the flame of the center plug 31 arrives.

After compression of air caused by the piston 14 moving toward the upper dead center of the cylinder head 12 and when the reverse squish is being generated, and before the flame of the center plug 31 arrives, should be mapped through preliminary testing. The controller 52 then controls the ignition timing of the peripheral plugs 32 based on the map.

According to the present embodiment shown in FIGS. 1A and 1B, the peripheral plugs 32 are aligned so that the leg 32c of the ground electrode 32b is positioned on the same side of the squish generating portion 21, relative to the center electrode 32a. The peripheral plugs 32 are ignited at the time when the reverse squish generated by the squish generating portion 21 flows between the center electrode 32a and the ground electrode 32b.

By doing so, the gas flow from the reverse squish can reach between the center electrode 32a and ground electrode 32b without interference from the ground electrode leg 32c. This allows ignition to a strong gas flow thereby increasing the diffusion speed of the flame thereafter, and therefore, stable combustion can be carried out, fuel costs are improved, and emissions can be reduced.

In addition, the squish generating portion 21 is formed on beneath the ridge-roof line 12a and a peripheral plug 32 is provided along the ridge-roof line 12a. Therefore, compared to the case in which the peripheral plug 32 is provided while the squish generating portion 21 is located at a position rotated 90 degrees relative to the present embodiment (in other words, the lateral side of the two inlet valves 15 and on the side of the two exhaust valves 16), the roof is located at a high place and thus, the space where the mixed air exists is greatly extended and consequently, a flame is easily developed. In addition, the squish generating portion 21 and peripheral plug 32 are provided both in the front and back of the engine (when viewed from the axis direction of the crankshaft), and the flame grows evenly in the entire combustion chamber. This allows stable combustion, improved fuel cost performance and reduction of emissions.

FIGS. 3–8 are drawings that show alternative embodiments of the peripheral plug arrangement of a internal combustion engine. In each of the embodiments below, the same numerals are assigned to the portion that takes the same role as explained in the above-mentioned embodiment, and the redundant descriptions are appropriately omitted.

Figure 3:
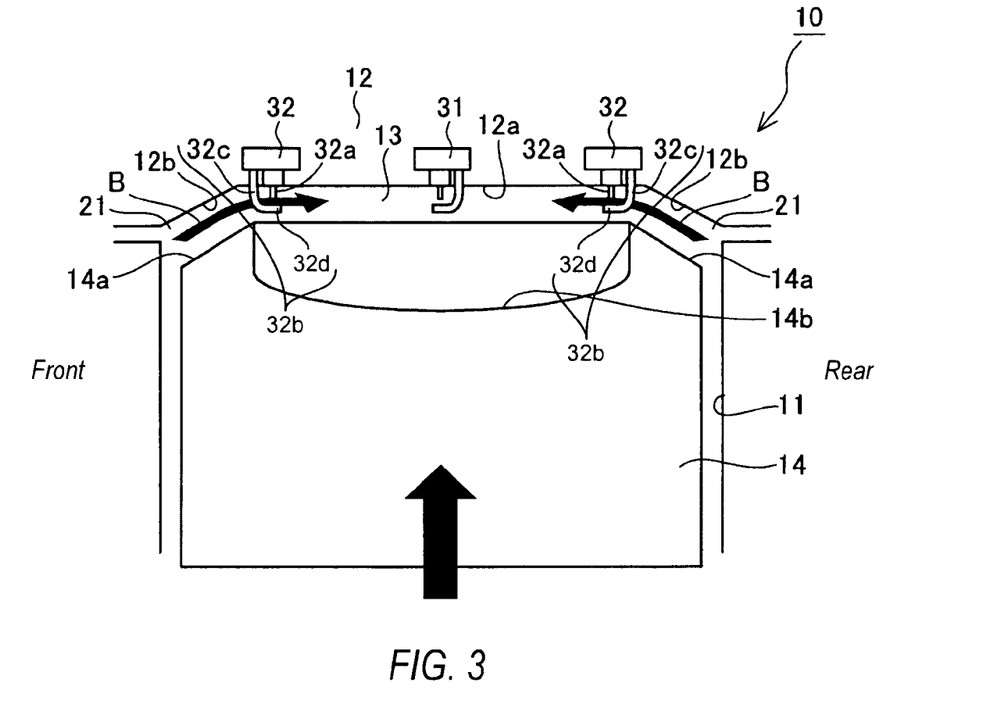
FIG. 3 is a side elevational view of a second embodiment of a peripheral plug arrangement of a internal combustion engine.

According to the above-mentioned first embodiment 1 shown in FIGS. 1A–1B, the peripheral plugs 32 are ignited after compression of air is caused by the piston 13 moving away from the upper dead center of the cylinder head 12 and when the reverse squish flows between the center electrode 32a and ground electrode 32b. According to the second embodiment which is illustrated in FIG. 3, the peripheral plugs 32 are ignited before compression of air is caused by the piston 14 moving toward the upper dead center of the cylinder head 12 and when the normal squish (shown as arrow B in FIG. 3) flows between the center electrode 32a and the ground electrode 32b.

By doing so, the flame ignited at the peripheral plugs 32 is sucked into the squish generation portion 21 without being inhibited by the ground electrode leg 32c and then diffused and spread. Consequently, the direction of the flame diffusion and the direction of the gas flow by reverse squish become identical thereby promoting the diffusion of the flame, and therefore, the non-combusted mixed air at the end of the combustion chamber can be efficiently combusted. Consequently, stable combustion can be carried out and the fuel cost is improved. In addition, during the exhaust process, the non-combusted gas is combusted again thereby raising the temperature of the exhaust and therefore the emission of hydrocarbon HC in the exhaust can be reduced.

Figure 4A:
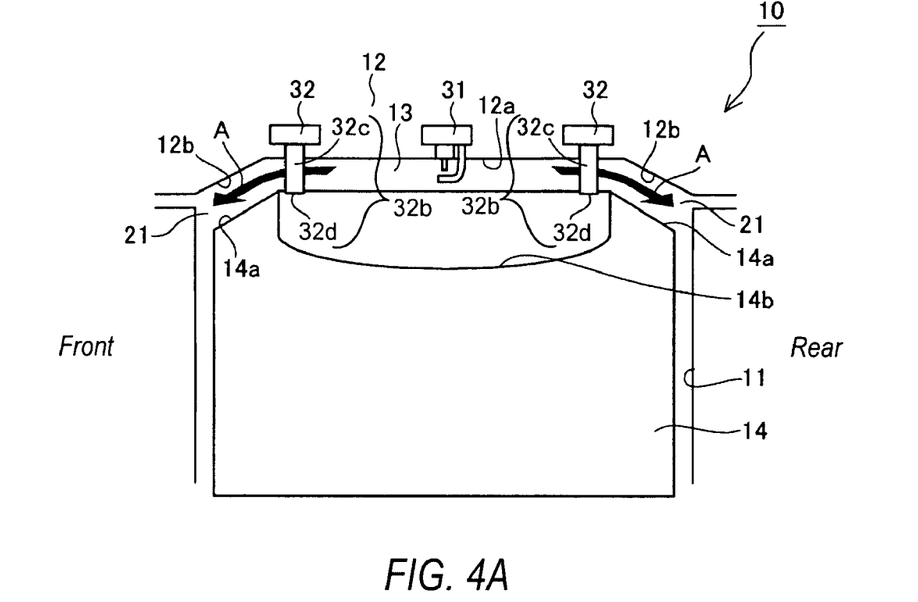
FIG. 4A is a side elevational view of a peripheral plug arrangement of a internal combustion engine according to a third embodiment.
Figure 4B:
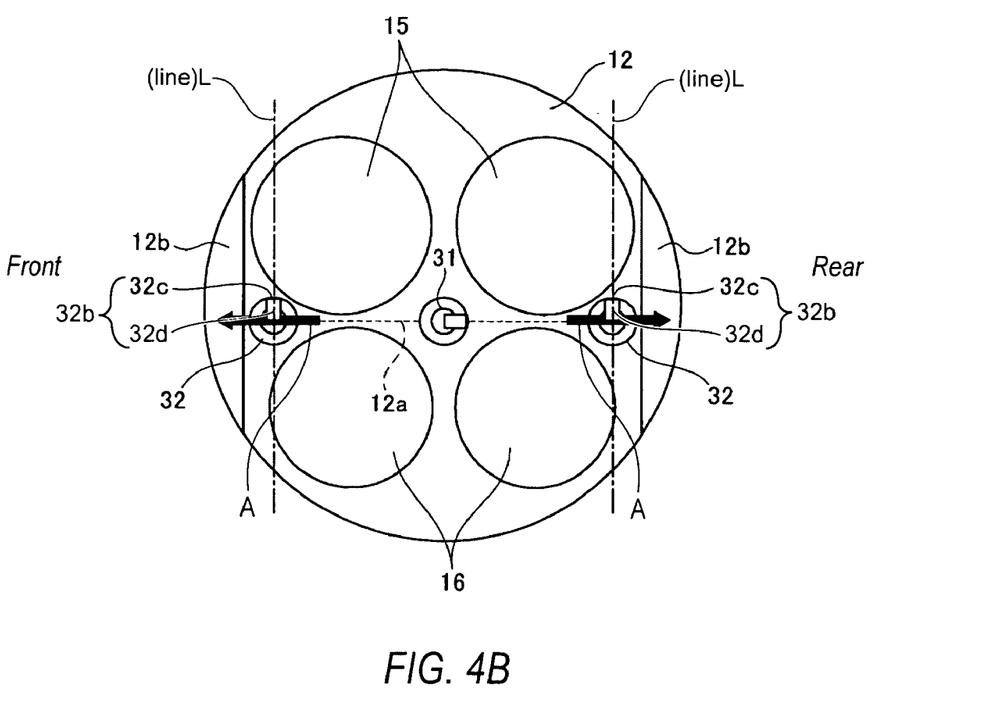
FIG. 4B is a top plan view of FIG. 4A.

A third embodiment of a multiple-point engine is shown in FIGS. 4A and 4B. In this embodiment, the center plug 31 is provided approximately at the center of the cylinder head 12. The center plug 31 is ignited before air is compressed by the piston 14 moving relative to the upper dead center of the cylinder head 12. The peripheral plugs 32 are provided at a location where the squish generated by the squish generating portion 21 can flow between the center electrode 32a and the ground electrode 32b. In this embodiment, the peripheral plugs 32 are ignited when the reverse squish flows between the center electrode 32a and ground electrode 32b. Therefore, ignition energy for the peripheral plugs 32 is reinforced compared to that of the center plug 31 so that they can be securely ignited without being extinguished due to the gas flow. The positioning details can be determined through preliminary testing, etc. In addition, the peripheral plugs 32 are aligned so that when the internal wall of the cylinder head is viewed from the piston side (FIG. 4B), the leg 32c of the ground electrode 32b does not overlap with the direction of the ridge-roof line 12a. More precisely, the ground electrode leg 32c (the generally parallel part of the ground electrode 32b) is positioned other than a position corresponding to a passage of the squish flow (A, B) passing through the igniter gap between the center electrode 32a and the ground electrode 32b in an axial cross section of the igniter plug 32. The direction of the passage of the squish flow is approximately the same as a radius direction of the cylinder bore. More preferably, the ground electrode leg 32c extends over a line (L) intersecting with a center axis of the igniter plug 32 and being perpendicular to a direction of the squish flow (A) passing through the igniter gap between the center electrode 32a and the ground electrode 32b. Accordingly, the back of the ground electrode leg 32c (the surface that does not face the center electrode 32a) becomes parallel to the ridge-roof line 12a. Furthermore, according to the present embodiment, the alignment is such that the ground electrode legs 32c of two peripheral plugs 32 are positioned on the same side relative to the ridge-roof line 12a. This alignment can be realized by adjusting the starting point of a thread of a female screw formed on the cylinder head 12 and a male screw that is formed on the peripheral plugs 32. Alternatively, the alignment can be carried out by using an alignment mark that corresponds to the position of the ground electrode leg 32c that may be provided on the housing, as the marker.

In the present embodiment, a controller 52, such as that shown in FIG. 2, ignites the peripheral plugs 32 after air is compressed by the piston 14 and the upper dead center of cylinder head 12 and when the reverse squish flows between the center electrode 32a and ground electrode 32b. More preferably, the peripheral plugs 32 ignite before the flame of the center plug 31 arrives.

According to the embodiment shown in FIGS. 4A and 4B, the peripheral plugs 32 are aligned so that the back of the ground electrode leg 32a becomes parallel to the ridge-roof line 12a and they are ignited at a time such that the reverse squish, which is generated by the squish generating portion 21 flows between the center electrode 32a and ground electrode 32b.

By doing so, the gas flow by reverse squish can reach between the center electrode 32a and the ground electrode 32b without being inhibited by the ground electrode leg 32c. In addition, the flame ignited at the peripheral plugs 32 is sucked into the squish generation portion 21 without being inhibited by the ground electrode leg 32c and then is diffused and spread. Consequently, the direction of the flame diffusion and the direction of the gas flow by reverse squish become identical thereby promoting the diffusion of the flame, and therefore, the non-combusted mixed air at the end of the combustion chamber can be efficiently combusted. Consequently, stable combustion can be carried out and the fuel cost is improved. In addition, during the exhaust process, the non-combusted gas is combusted again thereby raising the temperature of the exhaust and therefore the emission of hydrocarbon HC in the exhaust can be reduced.

Figure 5A:
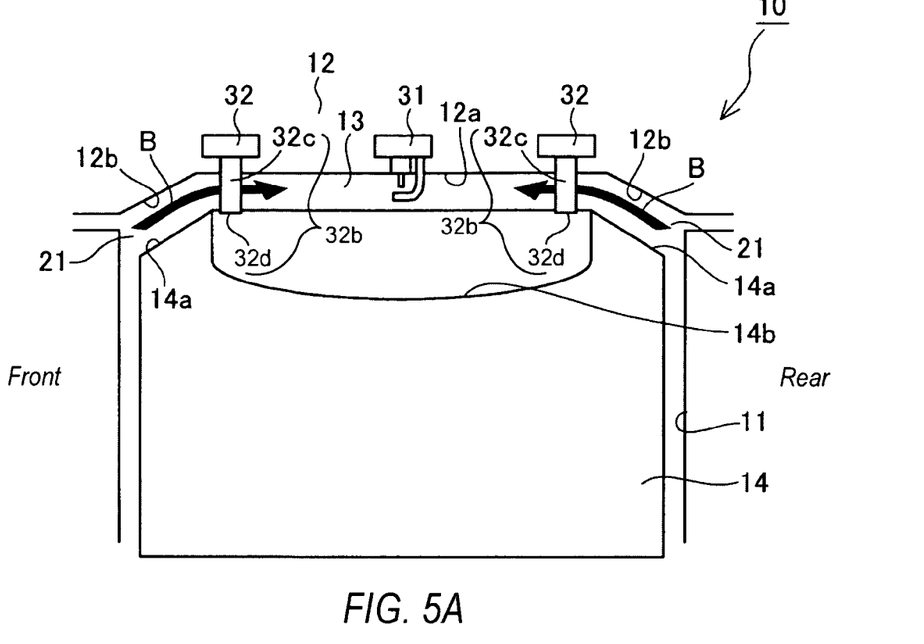
FIG. 5A is a side elevational view of a fourth embodiment of a peripheral plug arrangement of a internal combustion engine.
Figure 5B:
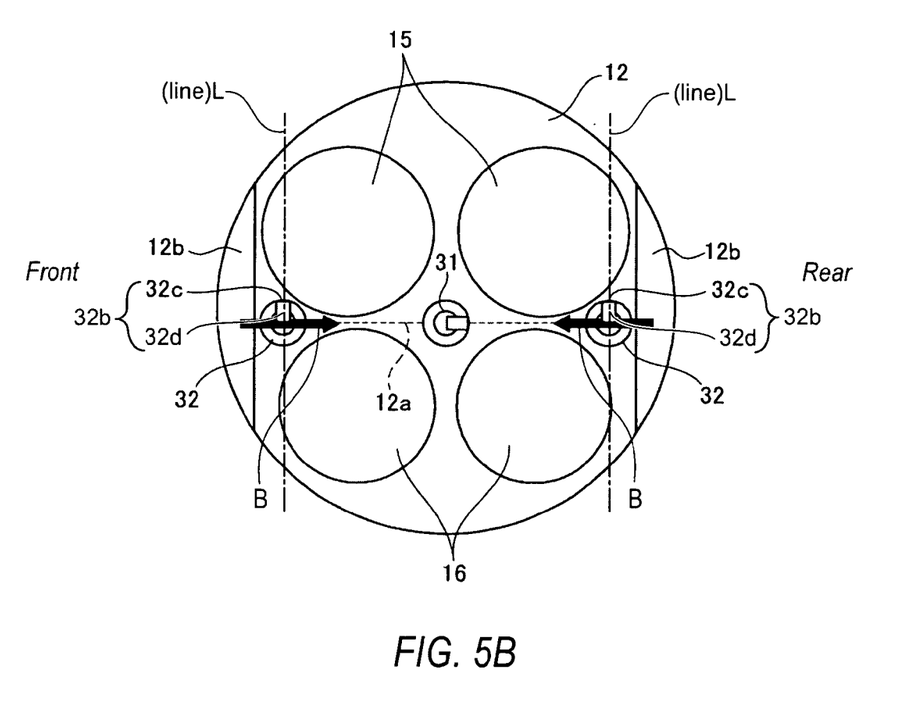
FIG. 5B is a top plan view of FIG. 5A.

FIGS. 5A and 5B illustrates a fourth embodiment of a internal combustion engine. According to the above-mentioned third embodiment, the peripheral plugs 32 are ignited after compression of air is caused by the piston 14 moving away from the upper dead center of the cylinder head 12 and when the reverse squish flows between the center electrode 32a and ground electrode 32b. According to the present embodiment, the peripheral plug 32 is ignited before compression of air is caused by the piston 14 moving toward the upper dead center of cylinder head 12 and when the normal squish (shown as arrow B in FIG. 5A) flows.

By doing so, the gas flow by normal squish can reach between the center electrode 32a and the ground electrode 32b without being inhibited by the ground electrode leg 32c. In addition, the flame ignited at the peripheral plugs 32 is sent to the center of the combustion chamber 12 without being inhibited by the ground electrode leg 32c and then diffused and spread. Consequently, the direction of the flame diffusion and the direction of the gas flow by reverse squish become identical thereby promoting the diffusion of the flame, and therefore, the non-combusted mixed air at the end of the combustion chamber can be efficiently combusted. Consequently, stable combustion can be carried out and the fuel cost is improved. In addition, during the exhaust process, the non-combusted gas is combusted again thereby raising the temperature of the exhaust and therefore the emission of hydrocarbon HC in the exhaust can be reduced.

Figure 6:
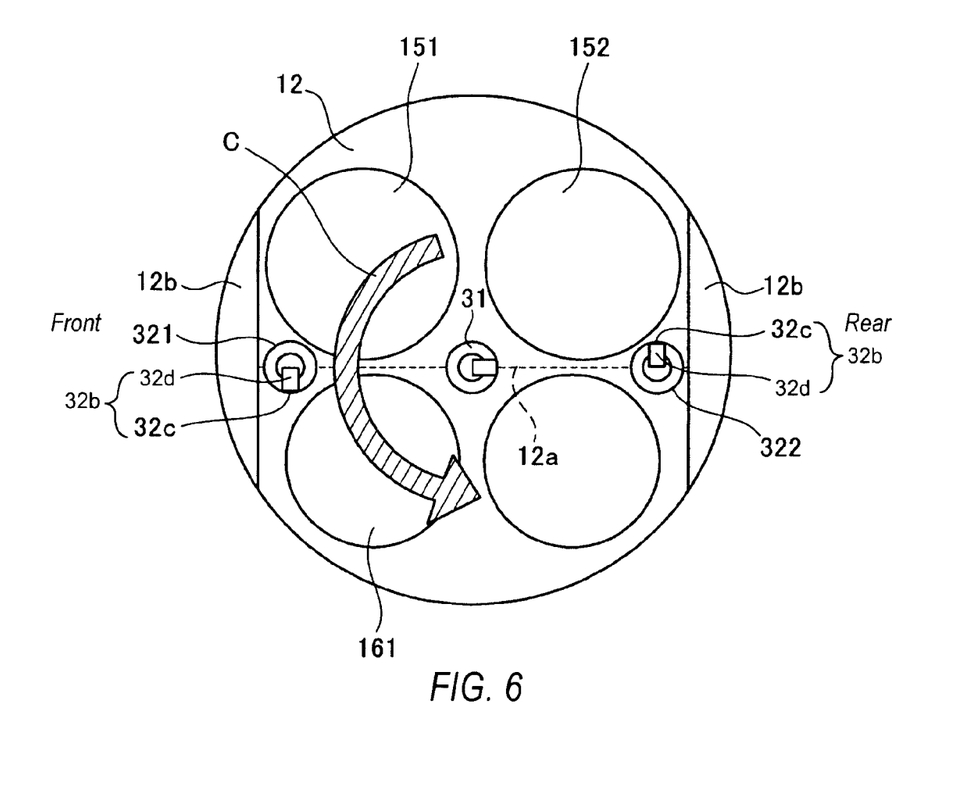
FIG. 6 is a top plan view of a fifth embodiment of a peripheral plug arrangement of a internal combustion engine.

FIG. 6 is a top planar view of a fifth embodiment of a internal combustion engine. In this embodiment, air is taken in from the inlet port circles 151 and 152 in the cylinder as a swirl flow as shown by arrow C. U.S. Pat. No. 4,768,487 which is hereby incorporated by reference discloses a swirl generating means.

Peripheral plugs 321 and 322 are aligned so that the backside of the ground electrode legs 32c become parallel to the ridge-roof line 12a while also being on the downstream side relative to the flow direction of the swirling flow. In other words, the ground electrode leg 32c of the peripheral plug 321 that is close to the inlet valve 151 that generates the swirl is located on the exhaust valve 161 side and the ground electrode leg 32c of the peripheral plug 322 that is away from the inlet valve 151 is located on the inlet valve 152 side.

By doing so, the gas flow, which is a swirling flow can reach between the center electrode 32a and the ground electrode 32b of the peripheral plugs 321 and 322 without interference from the ground electrode legs 32c. This allows ignition to a strong gas flow thereby increasing the diffusion speed of the flame thereafter, and therefore, stable combustion can be carried out, fuel costs are improved, and emissions can be reduced.

Figure 7A:
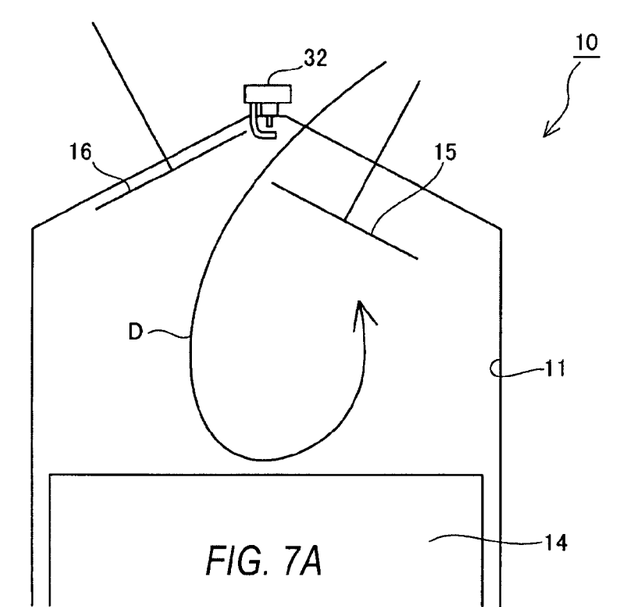
FIG. 7A is a side elevational view of a sixth embodiment of a peripheral plug arrangement of a internal combustion engine shown from a rear view of the engine.
Figure 7B:
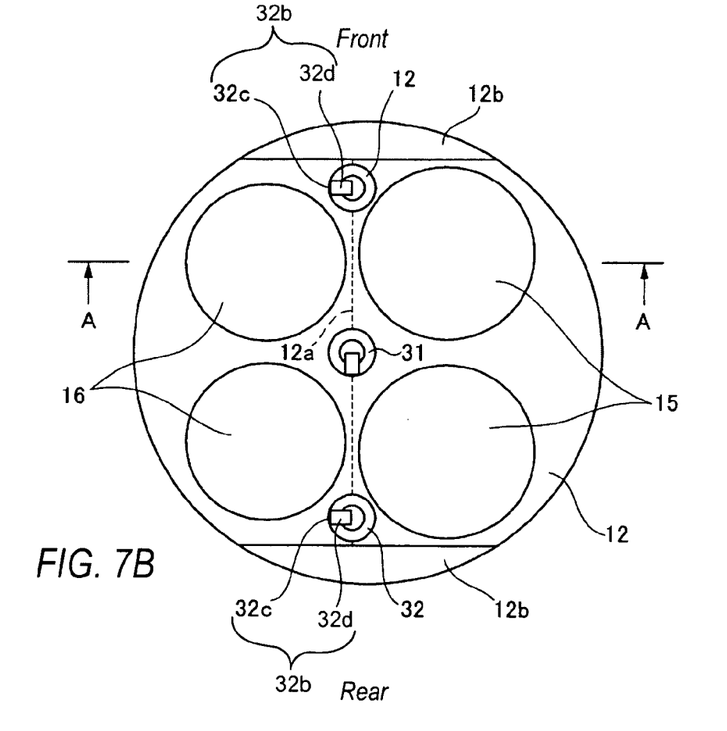
FIG. 7B is a top plan view of FIG. 7A.

FIGS. 7A and 7B illustrate a peripheral plug arrangement of a internal combustion engine according to a sixth embodiment. In this embodiment air is taken in from the inlet port circles vertically in the cylinder as a tumble flow as shown with arrow D in FIG. 7A, which is a side elevational view taken from the rear engine side. U.S. Pat. Nos. 6,705,275 and 5,305,720 which are hereby incorporated by reference disclose a normal tumble generating device and a reverse tumble generating device respectively.

The peripheral plugs 32 are aligned so that the backside of the ground electrode legs 32c become parallel to the ridge-roof line 12a and at the same time it is on the downstream side relative to the flow direction of the tumble flow. In other words, the ground electrode legs 32c of both of the two peripheral plugs 32 are on the side of the exhaust valve 16.

By doing so, the gas flow, which is a tumble flow, can reach between the center electrode 32a and the ground electrode 32b without interference from the ground electrode legs 32c. This allows ignition to a strong gas flow thereby increasing the diffusion speed of the flame thereafter, and therefore, stable combustion can be carried out, fuel costs are improved, and emissions can be reduced.

Figure 8A:
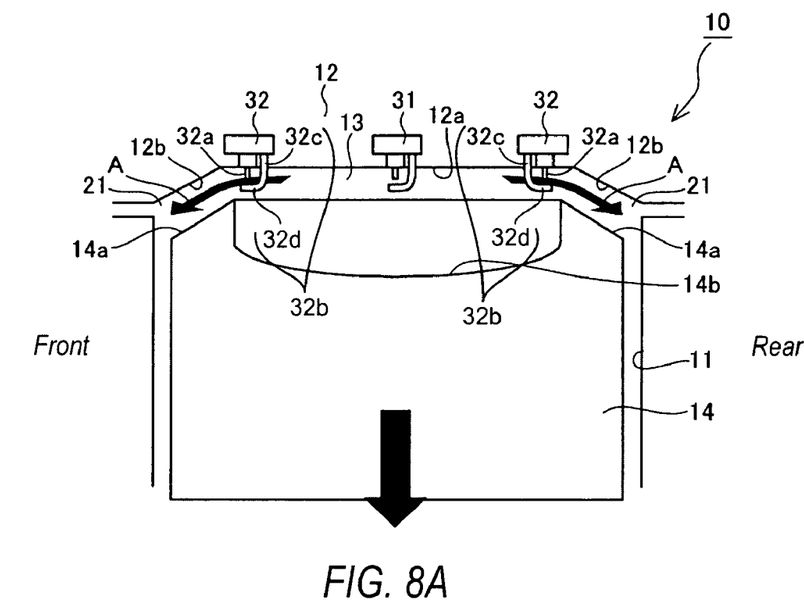
FIG. 8A is a side elevational view of a seventh embodiment of a peripheral plug arrangement of a internal combustion engine.
Figure 8B:
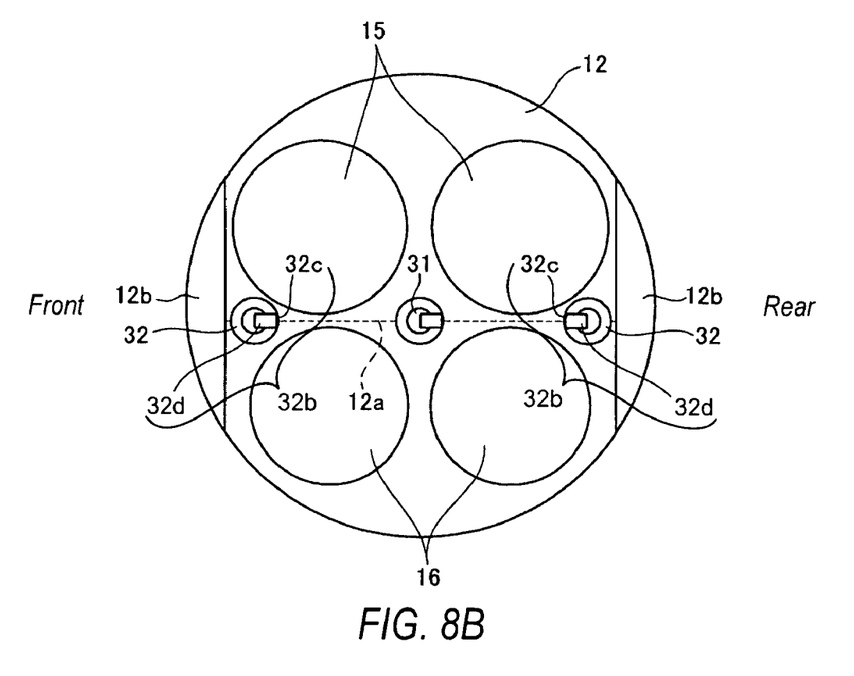
FIG. 8B is a top plan view of FIG. 8A.

FIGS. 8A and 8B illustrate a peripheral plug arrangement of a internal combustion engine according to a seventh embodiment. In this embodiment, the center plug 31, which is provided approximately at the center of the cylinder head 12, is ignited before compression of air is caused by the piston 14 moving toward the upper dead center of the cylinder head 12. The peripheral plugs 32 are provided at a location where the squish generated by the squish generating portion 21 can flow between the center electrode 32a and ground electrode 32b. In the embodiment illustrated in FIGS. 8A and 8B, the peripheral plugs 32 are ignited when the reverse squish flows between the center electrode 32a and ground electrodes 32b. Therefore, ignition energy for the peripheral plugs 32 is reinforced compared to that of the center plug 31 so that they can be securely ignited without being extinguished due to the gas flow. The positioning details of peripheral plugs 32 may be determined through preliminary testing, etc. The peripheral plugs 32 are aligned so that the leg 32c of the ground electrode 32b is on the opposite side of the squish generating portion 21 and across the center electrode 32a. This alignment can be realized by adjusting the starting point of a thread of the female screw formed on the cylinder head 12 and a male screw that is formed on the peripheral plugs 32. In addition, the alignment can be carried out by using an alignment mark that corresponds to the position of the ground electrode leg 32c that may be provided on the housing, as the marker.

In the present embodiment, a controller 52, such as that illustrated and described in connection with FIG. 2, ignites the peripheral plugs 32 after compression of air by the piston moving away from the upper dead center of the cylinder head 12 occurs and when the reverse squish flows between the center electrode 32a and ground electrode 32b. More preferably, the peripheral plugs ignite before the flame of the center plug 31 arrives.

According to the present embodiment, the peripheral plugs 32 are aligned so that the leg 32c of the ground electrode 32b is on the opposite side of the squish generating portion 21 and across the center electrode 32a and the peripheral plugs 32 are ignited at the time when the reverse squish that is generated by the squish generating portion 21 flows between the center electrode 32a and the ground electrode 32b.

By doing so, the flame ignited at the peripheral plugs 32 can be sucked into the squish generating portion 21 without being inhibited by the ground electrode leg 32c and can be diffused and spread. Consequently, the direction of the flame diffusion and the direction of the gas flow by reverse squish become identical thereby promoting the diffusion of the flame, and therefore, the non-combusted mixed air at the end of the combustion chamber can be efficiently combusted. Consequently, stable combustion can be carried out and the fuel cost is improved. In addition, during the exhaust process, the non-combusted gas is combusted again thereby raising the temperature of the exhaust and therefore the emission of hydrocarbon HC in the exhaust can be reduced.

Figure 9:
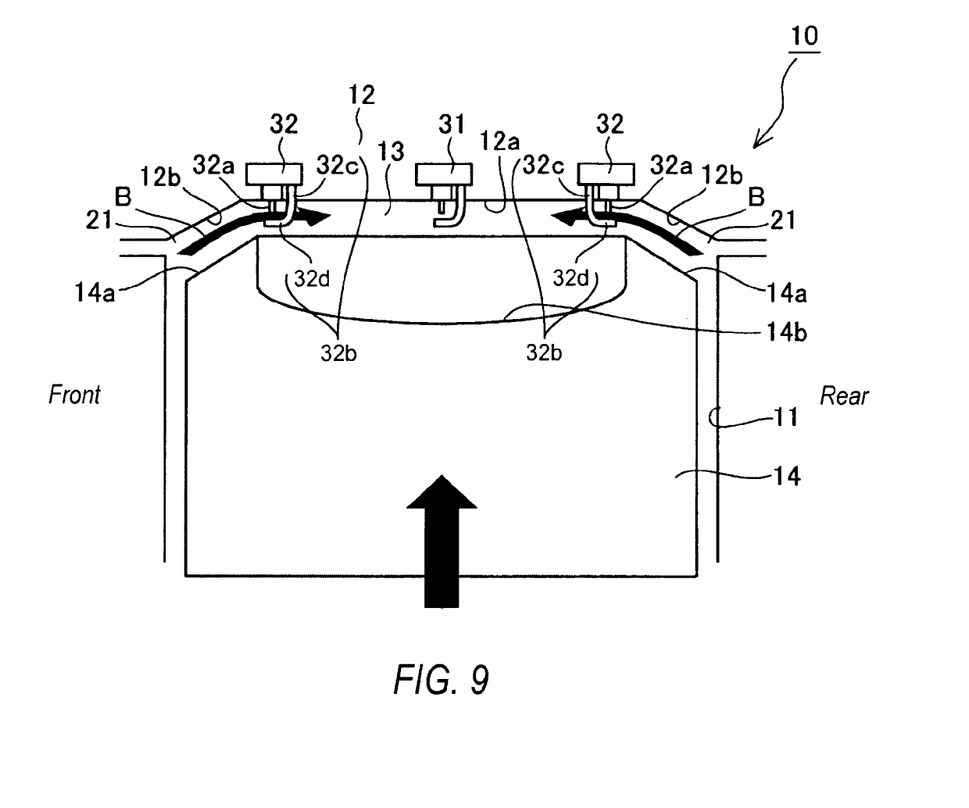
FIG. 9 is a side elevational view of an eighth embodiment of a peripheral plug arrangement of a internal combustion engine.

According to the above-mentioned seventh embodiment, the peripheral plugs 32 are ignited after the compression of air is caused by the piston 14 moving away from the upper dead center of the cylinder head 12 and when the reverse squish flows between the center electrode 32a and ground electrode 32b. According to an eighth embodiment that is illustrated in FIG. 9, the peripheral plug 32 is ignited before compression of air is caused by the piston moving toward the upper dead center of the cylinder head 12 and when the normal squish (shown as arrow B in FIG. 9) flows.

By doing so, the gas flow from the normal squish can reach between the center electrode 32a and ground electrode 32b without interference from the ground electrode leg 32c. This allows ignition to a strong gas flow thereby increasing the diffusion speed of the flame thereafter, and therefore, stable combustion can be carried out, fuel costs are improved, and emissions can be reduced.

It goes without saying that without being limited to the above-described embodiment, a variety of modifications and changes are possible within the extent of its technological philosophy, and those are equivalent to the present invention.

For example, it is acceptable that the peripheral plugs 32 are ignited multiple times, at the time when the normal squish flows between the center electrode 32a and the ground electrode 32b and at a time when the reverse squish flows there.

What is claimed is:

1. An internal combustion engine, comprising:
   a cylinder block formed with a cylinder bore,
   a cylinder head operatively connected to the cylinder block,
   a piston slidably disposed in the cylinder bore to define a combustion chamber,
   an engine front side squish area and an engine rear side squish area wherein the engine front and rear side squish areas include narrow gaps formed between the cylinder head and the piston and wherein the engine front and rear side squish areas generate a squish flow in the combustion chamber in response to the piston moving within the cylinder bore, wherein the engine front side squish area and the engine rear side squish area are placed within the cylinder bore at an engine front side and an engine rear side respectively,
   an engine front side igniter plug having a pair of electrodes and an engine rear side igniter plug having a pair of electrodes placed adjacent the respective engine front and rear side squish areas so that squish flow may pass through an igniter gap defined between the pairs of electrodes of the front and rear side igniter plugs,
   a pair of intake valves generally aligned in a crankshaft axial direction such that one intake valve is positioned on the engine front side and one intake valve is positioned on the engine rear side, and
   a pair of exhaust valves generally aligned in a crankshaft axial direction such that one exhaust valve is positioned on the engine front side and one exhaust valve is positioned on the engine rear side.

2. The engine as claimed in claim 1, further comprising:
   an ignition timing control system for controlling the ignition timing of each igniter plug.

3. The engine as claimed in claim 2, wherein the ignition timing control system further comprises a crank angle sensor and a controller.

4. The engine as claimed in claim 1, wherein the engine front side squish area extends across a substantial portion of the engine front side and wherein the engine rear side squish area extends across a substantial portion of the engine rear side.

5. An internal combustion engine, comprising:
   a cylinder block formed with a cylinder bore,
   a cylinder head operatively connected to the cylinder block, a piston slidably disposed in the cylinder bore to define a combustion chamber, an engine front side squish area and an engine rear side squish area wherein the engine front and rear side squish areas include front and rear side squish generation means that generates squish in the combustion chamber in response to the piston moving within the cylinder bore, wherein the engine front side squish area and the engine rear side squish area are placed within the cylinder bore at an engine front side and an engine rear side respectively, an engine front side igniter means and an engine rear side igniter means placed adjacent the respective engine front and rear side squish areas so that squish flow may pass through a gap defined within the front and rear side igniter means;

a pair of intake means generally aligned in a crankshaft axial direction such that one of the pair of intake means is positioned on the engine front side and the other of the pair of intake means is positioned on the engine rear side; and a pair of exhaust means generally aligned in the crankshaft axial direction such that one of the pair of exhaust means is positioned on the engine front side and the other of the pair of exhaust means is positioned on the engine front side.

6. The engine as claimed in claim 5, further comprising an ignition timing control means.

7. A method for reducing emissions in an internal combustion engine, comprising:

providing a cylinder block formed with a cylinder bore, providing a cylinder head operatively connected to the cylinder block, positioning a piston in slidable engagement within the cylinder bore to define a combustion chamber, providing an engine front side squish area and an engine rear side squish area wherein the engine front and rear side squish areas;

providing a pair of intake valves generally aligned in a crankshaft axial direction such that one intake valve is positioned on an engine front side and one valve is position on an engine rear side;

providing a pair of exhaust valves generally aligned in crankshaft axial direction such that one exhaust valve is positioned on the engine front side and one valve is position on the engine rear side;

generating a squish flow in at least one of the front and rear side squish areas of the combustion chamber in response to moving the piston moving up and down within the cylinder bore; and providing an engine front side igniter plug having a pair of electrodes and an engine rear side igniter plug having a pair of electrodes;

positioning the front side igniter plug adjacent the engine front side squish area; and positioning the rear side igniter plug adjacent to the engine rear side squish area;

wherein squish flow is directed through a gap defined between pairs of electrodes of at least one of the front and rear side igniter plugs.

8. The method as claimed in claim 7, further comprising: igniting at least one of the front and rear igniter plugs when squish is generated.

9. The method as claimed in claim 8, wherein the at least one of the front and rear igniter plugs is ignited when the piston moves up within the combustion chamber.

10. The method as claimed in claim 8, wherein the at least one of the front and rear igniter plugs is ignited when the piston moves down within the combustion chamber.

11. The method as claimed in claim 7, further comprising positioning the front and rear side igniter plugs such that the front and rear side igniter plugs are generally surrounded in a plan view by one of the intake valves, one of the exhaust valves, and the respective engine front and rear side squish areas.

12. An internal combustion engine, comprising:

a cylinder block formed with a cylinder bore, a cylinder head operatively connected to the cylinder block, a piston slidably disposed in the cylinder bore to define a combustion chamber, an engine front side squish area and an engine rear side squish area wherein the engine front and rear side squish areas include narrow gaps formed between the cylinder head and the piston and wherein the engine front and rear side squish areas generate a squish flow in the combustion chamber in response to the piston moving within the cylinder bore, wherein the engine front side squish area and the engine rear side squish area are placed within the cylinder bore at an engine front side and an engine rear side respectively, an engine front side igniter plug having a pair of electrodes and an engine rear side igniter plug having a pair of electrodes placed adjacent the respective engine front and rear side squish areas so that squish flow may pass through an igniter gap defined between the pairs of electrodes of the front and rear side igniter plugs;

a pair of intake valves generally aligned in a crankshaft axial direction such that one intake valve is positioned on the engine front side and one intake valve is positioned on the engine rear side; and a pair of exhaust valves generally aligned in the crankshaft axial direction such that one exhaust valve is positioned on the engine front side and one exhaust valve is positioned on the engine rear side;

wherein the respective engine front and rear side squish areas are positioned adjacent one of the intake valves and one of the exhaust valves which are placed side by side at the engine front and rear sides, respectively; and wherein the engine front and rear side igniter plugs are generally surrounded in a plan view by one of the intake valves, one of the exhaust valves and the respective engine front and rear side squish areas.

13. The engine as claimed in claim 12, wherein each igniter plug is ignited when the squish flow passes through the igniter gap that is defined between the electrodes of the respective igniter plug.

14. The engine as claimed in claim 13, wherein the squish flow is a reverse squish flow such that the piston moves down and away from the cylinder head within the cylinder bore.

15. The engine as claimed in claim 13, wherein the pair of electrodes of each igniter plug comprise a center electrode and a ground electrode;

wherein the center electrode extends substantially straightly in an axial direction of the igniter plug;

wherein the ground electrode includes a generally parallel part which is substantially parallel with the center electrode and a generally vertical part extending from the generally parallel part, wherein the generally vertical part is substantially vertical with the center electrode so that an end of the center electrode faces the generally vertical part, and wherein the generally parallel part of the ground electrode is positioned adjacent a side wall of the cylinder bore in an axial cross section of the igniter plug.

16. The engine as claimed in claim 13,
wherein the pair of electrodes of each igniter plug comprise a center electrode and a ground electrode;
wherein the center electrode extends substantially straightly in an axial direction of the igniter plug;
wherein the ground electrode includes a generally parallel part which is substantially parallel with the center electrode and a generally vertical part extending from the generally parallel part, wherein the generally vertical part is substantially vertical with the center electrode so that an end of the center electrode faces the generally vertical part, and
wherein the generally parallel part of the ground electrode is positioned other than a position corresponding to a passage of the squish flow passing through the igniter gap between the center electrode and the ground electrode in an axial cross section of the igniter plug.

17. The engine as claimed in claim 16,
wherein the generally parallel part of the ground electrode is positioned on a downstream side relative to the flow direction of a tumble flow in the combustion chamber.

18. The engine as claimed in claim 16,
wherein the generally parallel part of the ground electrode is positioned on a downstream side relative to the flow direction of a swirl flow in the combustion chamber.

19. The engine as claimed in claim 16,
wherein the generally parallel part extends over a line intersecting with a center axis of the igniter plug and being perpendicular to a direction of the squish flow passing through the igniter gap between the center electrode and the ground electrode.

20. The engine as claimed in claim 13,
wherein the pair of electrodes of each igniter plug comprise a center electrode and a ground electrode;
wherein the center electrode extends substantially straightly in an axial direction of the igniter plug,
wherein the ground electrode includes a generally parallel part that is substantially parallel with the center electrode and a generally vertical part extending from the generally parallel part, wherein the generally vertical part is substantially vertical with the center electrode so that an end of the center electrode faces the generally vertical part, and
wherein the generally parallel part of the ground electrode is positioned at a center side of the combustion chamber in an axial cross section of the igniter plug.

21. The engine as claimed in claim 13, wherein the squish flow is a normal squish flow such that the piston moves up and toward the cylinder head within the cylinder bore.

* * * * *